US 012518055B2

(12) United States Patent
Ghimire

(10) Patent No.: US 12,518,055 B2
(45) Date of Patent: Jan. 6, 2026

(54) SECURING STRUCTURED DATA RECORDS FOR EXTERNAL PARTIES

(71) Applicant: Capital One Services, LLC, McLean, VA (US)

(72) Inventor: Prashant Ghimire, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 335 days.

(21) Appl. No.: 18/148,676

(22) Filed: Dec. 30, 2022

(65) Prior Publication Data
US 2024/0220655 A1  Jul. 4, 2024

(51) Int. Cl.
*G06F 21/62* (2013.01)
*G06F 9/451* (2018.01)
*G06F 21/60* (2013.01)

(52) U.S. Cl.
CPC .......... *G06F 21/6254* (2013.01); *G06F 9/451* (2018.02); *G06F 21/604* (2013.01)

(58) Field of Classification Search
CPC ..... G06F 21/6254; G06F 21/604; G06F 9/451
USPC ......................................................... 726/28
See application file for complete search history.

(56) References Cited

U.S. PATENT DOCUMENTS

| | | | |
|---|---|---|---|
| 9,129,134 B2 * | 9/2015 | Vera | G06Q 10/10 |
| 9,449,181 B1 * | 9/2016 | Umapathy | H04L 63/102 |
| 9,571,516 B1 * | 2/2017 | Curcic | H04L 41/14 |
| 10,997,494 B1 * | 5/2021 | Ng | A63F 13/75 |
| 2007/0005717 A1 * | 1/2007 | LeVasseur | H04L 51/00 |
| | | | 709/206 |
| 2014/0090091 A1 * | 3/2014 | Prakash | G06F 21/6245 |
| | | | 726/30 |
| 2021/0256309 A1 * | 8/2021 | Huth | G06F 18/2148 |
| 2022/0203244 A1 * | 6/2022 | Ng | G06N 20/00 |

FOREIGN PATENT DOCUMENTS

CN   104301323 B   10/2017
WO   2015083115 A2  6/2015

* cited by examiner

*Primary Examiner* — Michael S McNally
(74) *Attorney, Agent, or Firm* — Harrity & Harrity, LLP

(57) ABSTRACT

In some implementations, a server may receive, from a user device, an indication of a privacy setting associated with an account of a user. The server may further receive, from a third-party application, a request for information associated with the account of the user. The server may apply one or more masks to entries in a structured data record that is associated with the account of the user, to generate masked entries. The server may further generate pseudo-random identifiers for the masked entries. The server may transmit, to the third-party application, the masked entries in association with the pseudo-random identifiers.

20 Claims, 15 Drawing Sheets

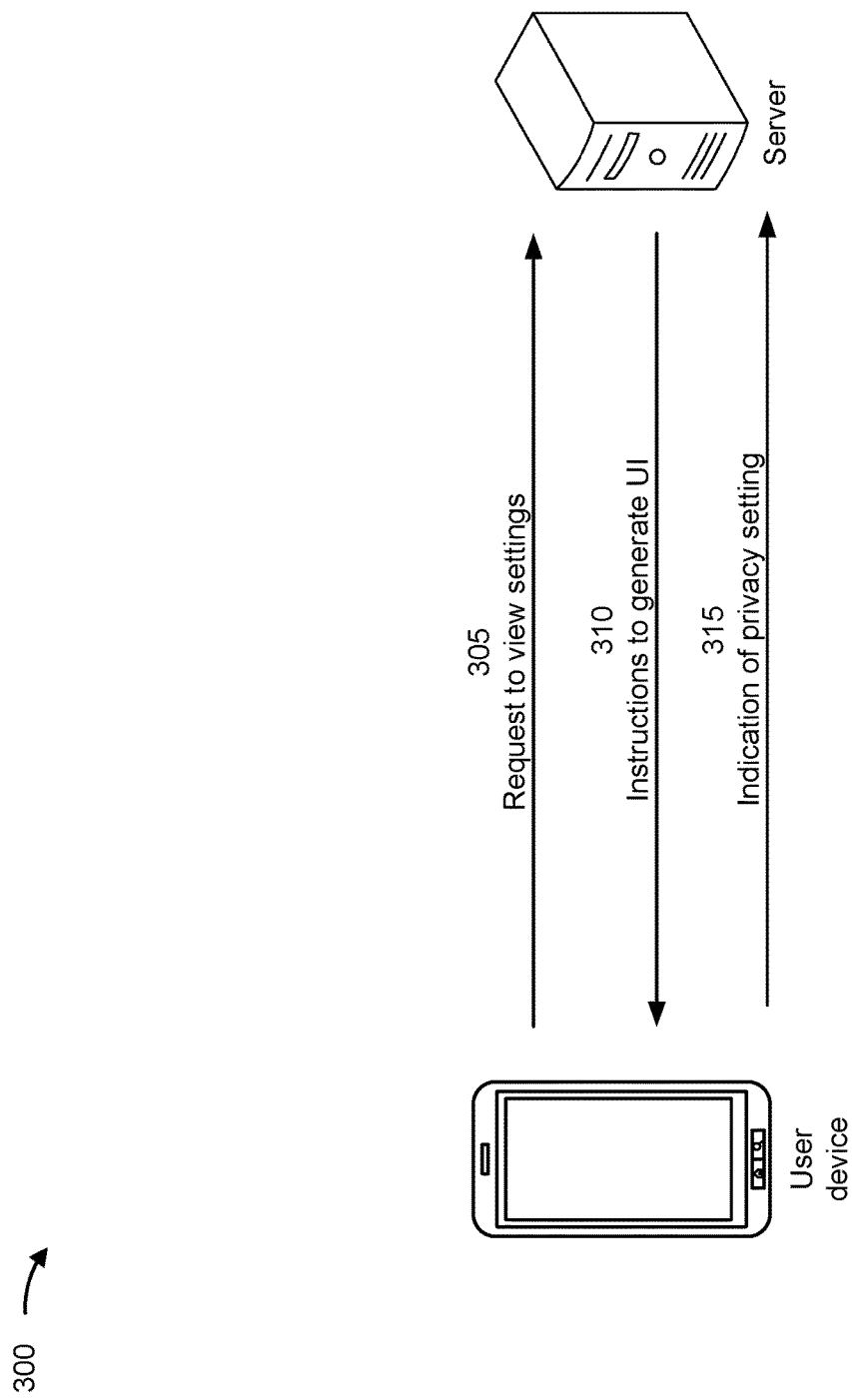

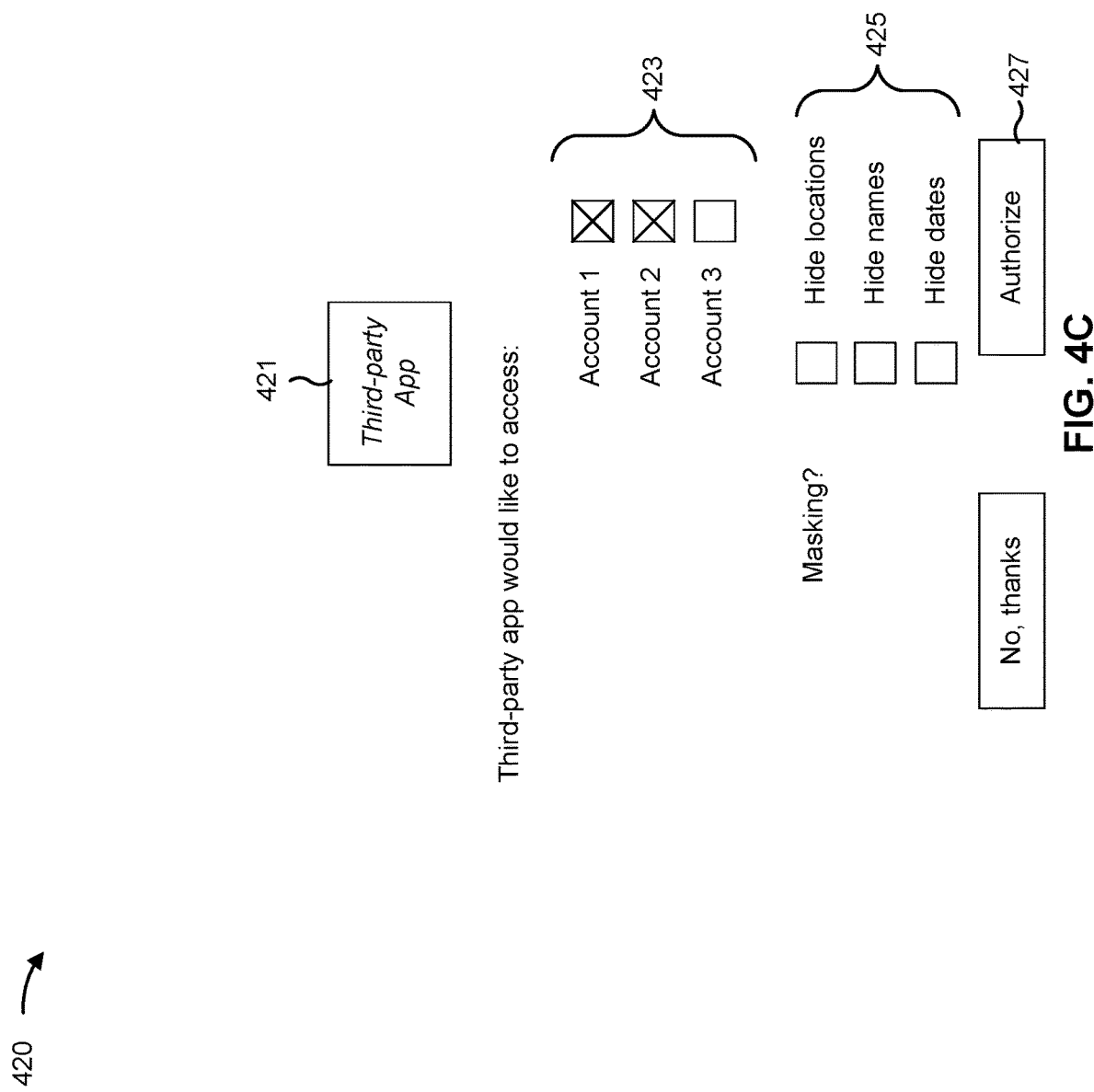

SECURING STRUCTURED DATA RECORDS FOR EXTERNAL PARTIES

BACKGROUND

Structured data records, such as transaction records, may be shared with a user that owns (or at least controls) accounts with which the structured data records are associated. The user may also authorize third-party applications to receive the structured data records.

SUMMARY

Some implementations described herein relate to a system for securing structured data records provided to external parties. The system may include one or more memories and one or more processors communicatively coupled to the one or more memories. The one or more processors may be configured to receive, from a user device, an indication of a privacy setting associated with one or more accounts of a user. The one or more processors may be configured to receive, from a third-party application, a request for information associated with the one or more accounts of the user. The one or more processors may be configured to apply one or more masks to entries in one or more structured data records that are associated with the one or more accounts of the user, to generate masked entries, wherein the one or more masks are selected based on the indication of the privacy setting. The one or more processors may be configured to generate pseudo-random identifiers for the masked entries. The one or more processors may be configured to transmit, to the third-party application, the masked entries in association with the pseudo-random identifiers.

Some implementations described herein relate to a method of securing structured data records provided to external parties. The method may include receiving, from a user device, an indication of a privacy setting associated with an account of a user. The method may include receiving, from a third-party application, a request for information associated with the account of the user. The method may include applying, by a server, one or more masks to entries in a structured data record that is associated with the account of the user, to generate masked entries. The method may include generating, by the server, pseudo-random identifiers for the masked entries. The method may include transmitting, to the third-party application, the masked entries in association with the pseudo-random identifiers.

Some implementations described herein relate to a non-transitory computer-readable medium that stores a set of instructions for securing structured data records provided to external parties for a device. The set of instructions, when executed by one or more processors of the device, may cause the device to receive, from a user device, an indication of a privacy setting associated with a set of accounts of a user. The set of instructions, when executed by one or more processors of the device, may cause the device to receive, from a third-party application, a request for information associated with at least one account of the set of accounts. The set of instructions, when executed by one or more processors of the device, may cause the device to apply a set of masks to a set of entries in at least one structured data record that is associated with the at least one account, to generate a set of masked entries. The set of instructions, when executed by one or more processors of the device, may cause the device to transmit, to the third-party application, the set of masked entries.

BRIEF DESCRIPTION OF THE DRAWINGS

FIG. 3 is a diagram of an example implementation relating to receiving an indication of a privacy setting, in accordance with some embodiments of the present disclosure.

FIGS. 4A-4C are diagrams of example user interfaces (UIs), in accordance with some embodiments of the present disclosure.

DETAILED DESCRIPTION

The following detailed description of example implementations refers to the accompanying drawings. The same reference numbers in different drawings may identify the same or similar elements.

A server may store and manage structured data records (e.g., transaction records) associated with accounts. For example, the server may be associated with an entity that manages the accounts (e.g., bank accounts) and may track events (e.g., transactions) associated with the accounts in the structured data records corresponding to the accounts. The server may provide access to the structured data records for users that own (or at least control) the accounts. For example, a user may provide a username and password (and/or another type of credential) via a user device, and the server may return structured data records corresponding to the user's accounts to the user device.

The user may also authorize third-party applications to receive the structured data records. For example, the user may subscribe to a budgeting service or another type of service that processes and visualizes information associated with the user's accounts. Accordingly, the server may establish an application programming interface (API) endpoint and authorize a third-party application that is approved by the user to access the structured data records associated with the user via the API endpoint.

However, the structured data records may include information that is personal to the user, such as entity names associated with entries in the records, locations associated with entries in the records, and dates (optionally with times) associated with entries in the records, among other examples. These additional details not only reduce the user's privacy but also consume additional power, processing resources, and networking resources because the server sends more information to the third-party application by including the information that is personal to the user.

Some implementations described herein provide for masking entries in structured data records before transmitting the entries to a third-party application. For example, a server that stores and manages the structured data records may apply a mask to remove or replace entity names, locations, and/or dates included in the entries. As a result, the server protects privacy of a user that owns or controls accounts associated with the structured data records. Furthermore, the server reduces a size of the entries before transmitting the entries to the third-party application, which conserves power and processing resources at both the server and the third-party application and conserves networking resources.

FIGS. 1A-1D are diagrams of an example 100 associated with securing structured data records for external parties. As shown in FIGS. 1A-1D, example 100 includes a server, a user device, and a third-party application (e.g., implemented on a third-party device). These devices are described in more detail in connection with FIGS. 6 and 7.

Figure 1A:
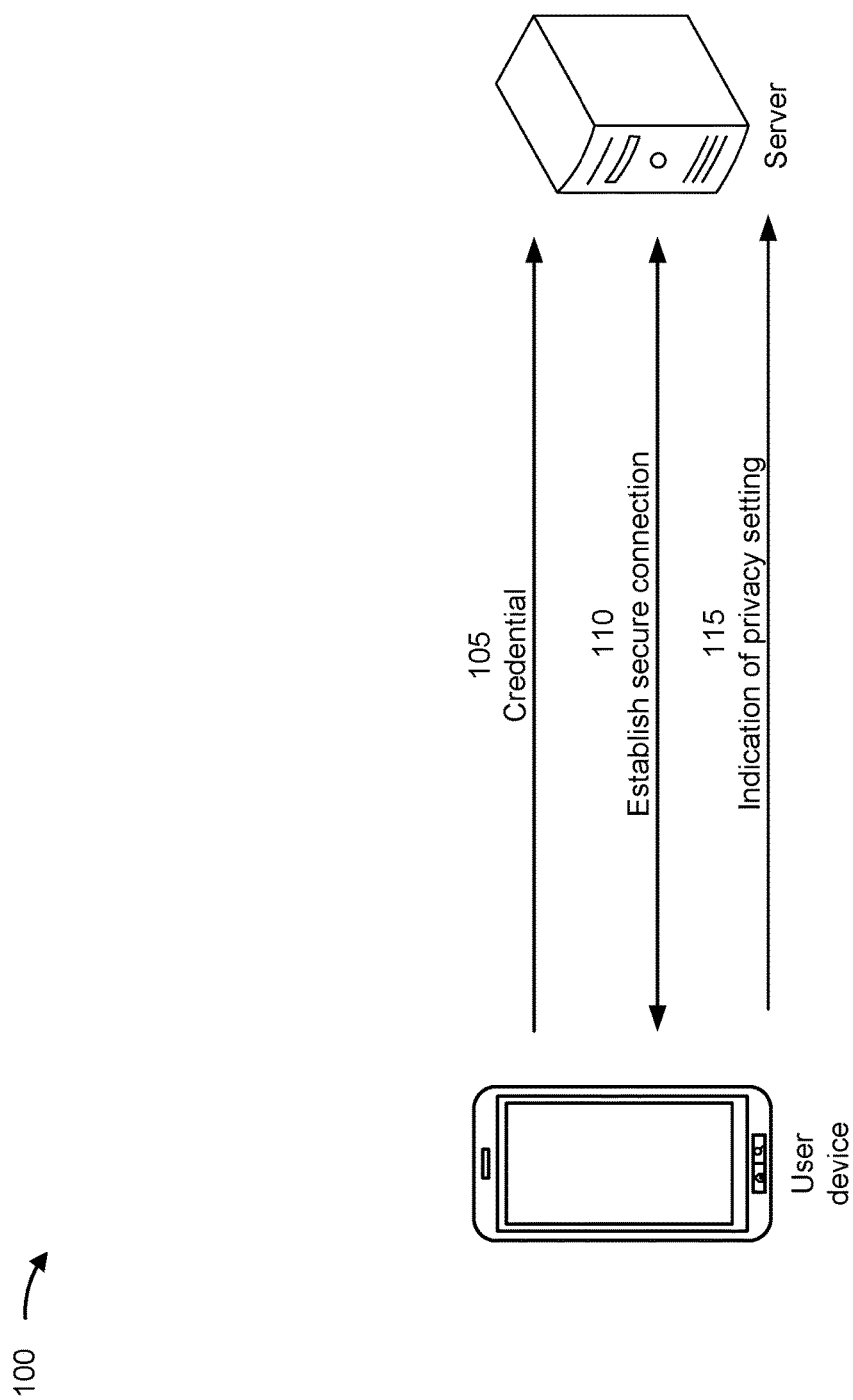
FIGS. 1A-1D are diagrams of an example implementation relating to securing structured data records for external parties, in accordance with some embodiments of the present disclosure.

As shown in FIG. 1A and by reference number 105, the user device may transmit, and the server may receive, a credential (e.g., at least one credential) associated with a user of the user device. For example, the credential may include a username and password, a passcode, a personal identification number (PIN), a biometric indicator associated with the user, and/or another type of information uniquely associated with the user, among other examples. In one example, the user device may receive input from the user (e.g., via a touchscreen, a mouse, a keyboard, and/or another type of input device) and navigate to a website (e.g., using a web browser implemented on the user device) in response to the input. The website may be hosted by, or at least associated with, the server. Accordingly, the user may interact with the website in order to trigger the user device to transmit the credential to the server (e.g., via a hyperlink transfer protocol (HTTP) request, an API call, and/or another similar type of request). In some implementations, the user device may further transmit, and the server may receive, a request to view settings associated with an account of the user, as described in connection with FIG. 3.

Alternatively, the server may transmit, and the user device may receive, a push notification and/or another type of notification requesting the user to provide the credential to the server. In some implementations, the third-party application may transmit, and the server may receive, a request to establish a link associated with the account of the user, as described in connection with FIG. 2. For example, the user may provide input (e.g., via the input device associated with the user device) to the third-party application that causes the third-party application to transmit the request. The input may indicate the server such that the third-party application transmits the request to the server selected using an indication included in the input. Accordingly, the notification from the server to the user device may be based on (e.g., triggered by) the request from the third-party application.

Using the credential, the server and the user device may establish a secure connection, as shown by reference number 110. The secure connection may include an HTTP secure (HTTPS) connection using transport layer security (TLS) or a secure sockets layer (SSL), a connection using another type of public-private key encryption, a connection using symmetric key encryption, and/or a connection using another type of secure protocol. Accordingly, the server and the user device may exchange encrypted messages on the secure connection.

As shown by reference number 115, the user device may transmit, and the server may receive, an indication of a privacy setting associated with an account (e.g., one or more accounts) of the user. The user device may transmit, and the server may receive, the indication of the privacy setting using the secure connection. In some implementations, the user may trigger transmission of the indication of the privacy setting using a user interface (UI) associated with a request from the third-party application, as described in connection with FIGS. 2 and 4A-4C. Alternatively, the user may trigger transmission of the indication of the privacy setting using a UI associated with settings for the account of the user, as described in connection with FIGS. 3 and 5A-5C.

The indication of the privacy setting may include activation of a privacy mode (e.g., as described in connection with FIGS. 4A and 5A), selection of a privacy mode from a plurality of possible privacy modes (e.g., as described in connection with FIGS. 4B and 5B), or selection of mask types (e.g., one or more mask types) from a set of possible mask types (e.g., as described in connection with FIGS. 4C and 5C), among other examples.

Figure 1B:
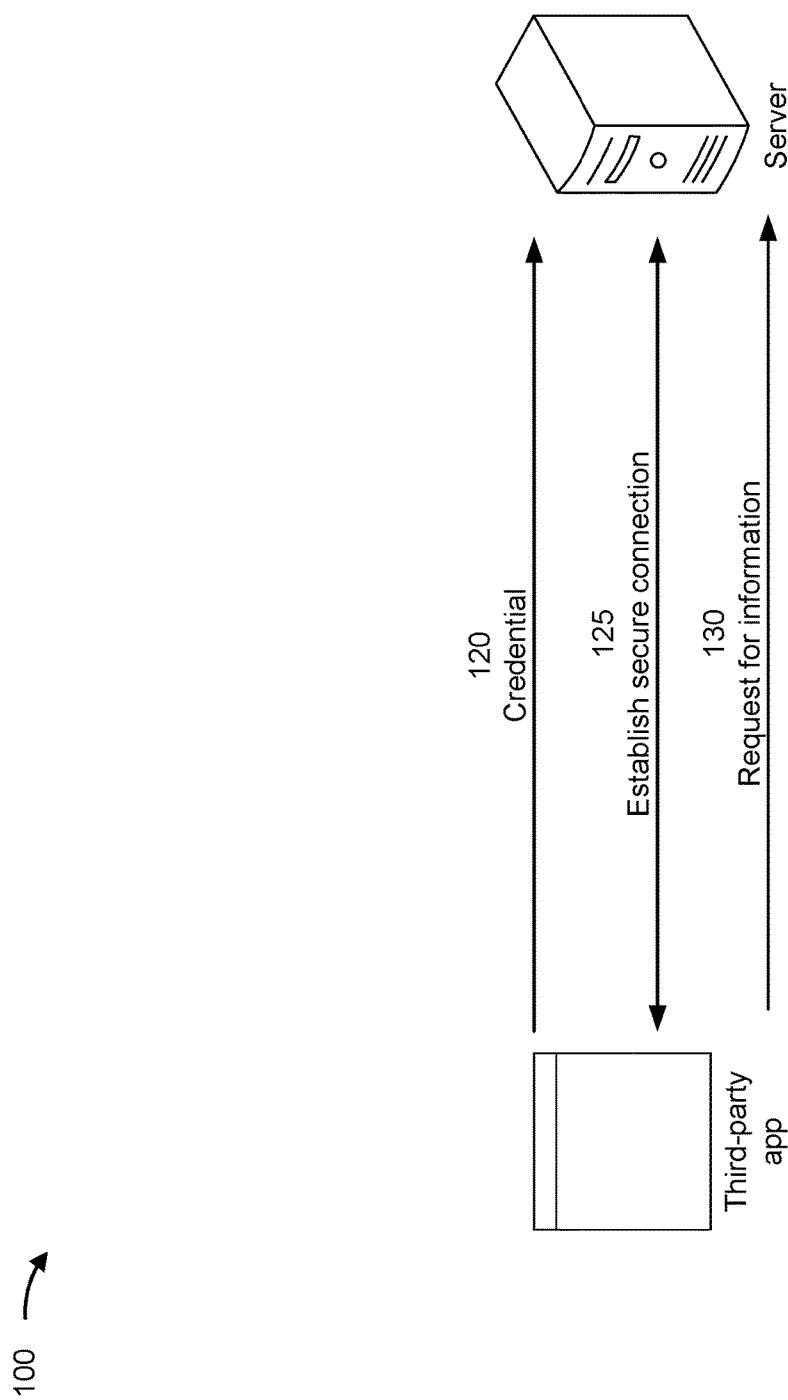

As shown in FIG. 1B and by reference number 120, the third-party application may transmit, and the server may receive, a credential (e.g., at least one credential). For example, the credential may include a key, a certificate, and/or another type of information assigned from the server to the third-party application, among other examples. The server may have assigned the credential to the third-party application during an initial setup procedure (e.g., as described in connection with FIG. 2). As used herein, "third-party application" refers to an application that is developed and/or maintained by an entity that is separate from the entity that manages the account of the user (and/or the entity that owns, or at least controls and manages, the server). The third-party application may be installed on the user device and associated with a third-party server.

In one example, the third-party application may receive input from the user (e.g., via a touchscreen, a mouse, a keyboard, and/or another type of input device associated with the user device) and transmit the credential to the server in response to the input. For example, the user may log into the third-party application such that the third-party application transmits the credential to the server in order to update information associated with the account of the user. Alternatively, the user may interact with a UI of the third-party application in order to trigger the third-party application to transmit the credential. For example, the user may tap, click, or otherwise interact with a "refresh" button or icon to cause the third-party application to transmit the credential to the server in order to update information associated with the account of the user.

Alternatively, the third-party application may transmit the credential to the server based on a schedule associated with updating information associated with the account of the user. For example, the third-party application may be configured to update information associated with the account of the user every day, every other day, or every week, among other examples. In some implementations, the user may configure the schedule (e.g., by providing input to the third-party application via the user device). Alternatively, the schedule may be a default schedule. The default schedule may be generic or may be associated with the server. For example, different entities that manage accounts may be associated with different default schedules such that the third-party application selects the default schedule based on which entity is associated with the server.

Using the credential, the server and the third-party application may establish a secure connection, as shown by reference number 125. The secure connection may include an HTTPS connection using TLS or an SSL, a connection using another type of public-private key encryption, a connection using symmetric key encryption, and/or a connection using another type of secure protocol. Accordingly, the server and the user device may exchange encrypted messages on the secure connection.

As shown by reference number 130, the third-party application may transmit, and the server may receive, a request for information associated with the account of the user. The third-party application may transmit, and the server may receive, the request for information using the secure connection. For example, the third-party application may perform an API call to an endpoint that was indicated to the third-party application during an initial setup procedure (e.g., as described in connection with FIG. 2). The request may include (e.g., as a parameter of the API call) an indication of the user and/or of the account. For example, the third-party application may include a name or another alphanumeric identifier of the user in the request. Accordingly, the third-party application may request information associated with multiple accounts of the user with a single identifier. Alternatively, the third-party application may include an account number or another alphanumeric identifier of the account in the request. Accordingly, the request may include multiple identifiers when the third-party application is requesting information associated with a plurality of accounts of the user.

In some implementations, the user may trigger transmission of the request for information (e.g., the user may trigger transmission of the credential, as described above, which also triggers transmission of the request). Alternatively, the third-party application may transmit the request for information based on a schedule (e.g., as described above in connection with the credential).

Figure 1C:
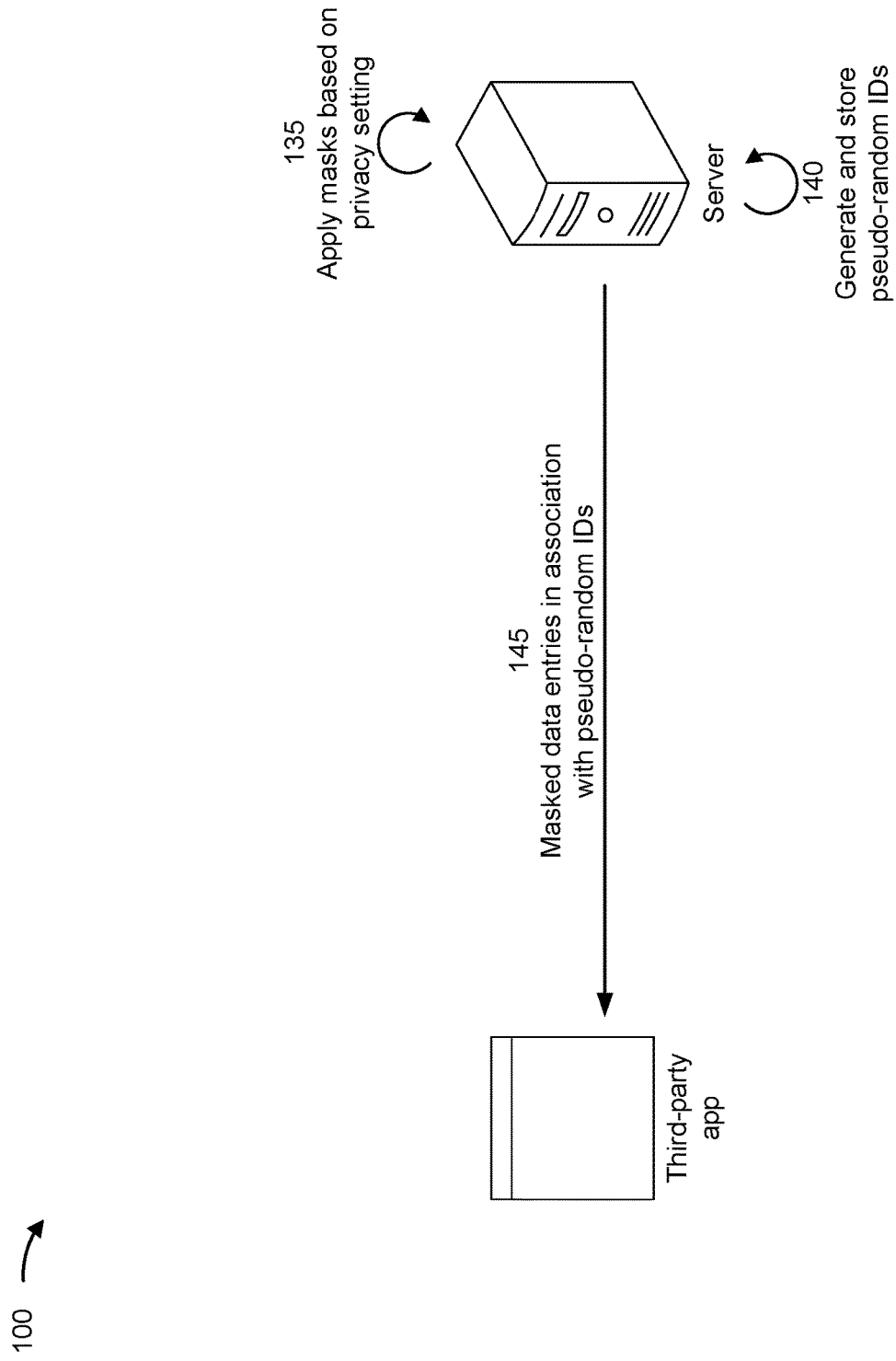

As shown in FIG. 1C and by reference number 135, the server may apply a set of masks (e.g., one or more masks) to entries (e.g., at least one entry) in a structured data record (e.g., one or more structured data records) that is associated with the account of the user to generate masked entries (e.g., at least one masked entry). The server may determine to apply the set of masks based on a source of the request. For example, the indication of the privacy setting from the user device may be associated with the third-party application. Accordingly, the server may determine to apply the set of masks by mapping (e.g., using a relational data structure or another similar data structure) an identifier of the third-party application that the user device transmitted with the indication of the privacy setting (e.g., a name of the third-party application, a medium access control (MAC) address associated with the third-party application, and/or an Internet protocol (IP) address associated with the third-party application, among other examples) to the indication of the privacy setting. In another example, the server may associate the endpoint of the API that was called by the third-party application with the indication of the privacy setting. Accordingly, the server may determine to apply the set of masks by mapping (e.g., using a relational data structure or another similar data structure) an identifier of the endpoint (e.g., an IP address and/or another identifier of the endpoint) to the indication of the privacy setting.

As used herein, "structured data record" refers to a set of data that is organized according to a data model. For example, the structure data record may include an event log, such as a transaction record for the account of the user. A structured data record is different than unstructured data, which is usually text-based.

In one example, the set of masks may include a mask that removes transaction identifiers included in the entries. Transaction identifiers may include alphanumeric identifiers that are included in the entries and may be used to retrieve the entries (e.g., from a relational data structure or another similar type of data structure maintained by the server). Accordingly, the transaction identifiers may function as internal indices for the entries on the server. Removing the transaction identifiers protects the security of the structured data record as maintained by the server because the third-party application will not see how the entries are indexed on the server. Additionally, removing the transaction identifiers reduces a size of the masked entries as compared with the unmasked entries. As a result, the server will consume less power, fewer processing resources, and fewer networking resources in transmitting the masked entries to the third-party application as compared with transmitting the unmasked entries to the third-party application.

Additionally, or alternatively, the set of masks may include a mask that replaces entity names, included in the entries, with categories corresponding to the entity names. The entity names may include merchant names associated with transactions represented by the entries, bank names associated with transactions represented by the entries, and/or other types of entity names. The server may apply a model (e.g., a rule-based model or a machine learning model, among other examples) that accepts entries as inputs and outputs category tags for the entries. The category tags may include string descriptors, such as "café," "restaurant," "entertainment," or "miscellaneous," among other examples. In some implementations, the server may store the category tags (e.g., output by the model after the model is executed by the server) in association with the entries such that the mask removes the entity names and leaves the category tags remaining. Accordingly, the server may make the category tags available to the user device when the user device accesses the structured data record. Alternatively, the mask may trigger execution of the model by the server in order to replace the entity names with the category tags output by the model. Replacing entity names with category tags protects the security of the structured data record as maintained by the server because the third-party application will not see the entity names. Additionally, replacing entity names with category tags may reduce a size of the masked entries as compared with the unmasked entries. As a result, the server may consume less power, fewer processing resources, and fewer networking resources in transmitting the masked entries to the third-party application as compared with transmitting the unmasked entries to the third-party application.

Additionally, or alternatively, the set of masks may include a mask that removes location indicators included in the entries. In some implementations, the location indicators may be received by the server (e.g., during processing of transactions represented by the entries). Additionally, or alternatively, the server may apply a model (e.g., a rule-based model or a machine learning model, among other examples) that accepts entries as inputs and outputs location indicators for the entries. Accordingly, the model may transform store numbers into addresses or otherwise convert one type of location indicator received by the server (e.g., during processing of transactions represented by the entries) into another type of location indicator. In another example, the model may standardize location indicators received by the server (e.g., by standardizing addresses). The mask may therefore remove the location indicators, whether received by the server and/or output by the model. Alternatively, the set of masks may include a mask that replaces the location indicators, included in the entries, with geographic area indicators corresponding to the location indicators. For example, the mask may remove street numbers and/or street names from the location indicators such that the masked entries only include city names, state names, zip codes, and/or country names, among other examples. Additionally, or alternatively, the mask may replace the location indicators with regional indicators. For example, the mask may replace any addresses associated with California, Oregon, or Washington state with a "West coast" indicator. In another example, the mask may replace location indicators associated with Austria, Belgium, France, Germany, Liechtenstein, Luxembourg, Monaco, Netherlands, or Switzerland with a "Western Europe" indicator. Removing location indicators (or replacing location indicators with geographic area indicators) protects the security of the structured data record as maintained by the server because the third-party application will not see the location indicators. Additionally, removing location indicators (or replacing location indicators with geographic area indicators) may reduce a size of the masked entries as compared with the unmasked entries. As a result, the server may consume less power, fewer processing resources, and fewer networking resources in transmitting the masked entries to the third-party application as compared with transmitting the unmasked entries to the third-party application.

Additionally, or alternatively, the set of masks may include a mask that replaces date indicators, included in the entries, with month indicators corresponding to the date indicators. In some implementations, the date indicators may be received by the server (e.g., during processing of transactions represented by the entries). Additionally, or alternatively, the server may generate the date indicators when the server updates the entries (e.g., when processing of transactions represented by the entries is complete). The mask may remove the day indicators, from the date indicators, such that only the months (and years) associated with the entries remain. Additionally, or alternatively, the set of masks may include a mask that removes time indicators included in the entries. In some implementations, the time indicators may be received by the server (e.g., during processing of transactions represented by the entries). Additionally, or alternatively, the server may generate the time indicators when the server updates the entries (e.g., when processing of transactions represented by the entries is complete). Removing time indicators and/or replacing date indicators with month indicators protects the security of the structured data record as maintained by the server because the third-party application will not see the time indicators. Additionally, removing time indicators and/or replacing date indicators with month indicators may reduce a size of the masked entries as compared with the unmasked entries. As a result, the server may consume less power, fewer processing resources, and fewer networking resources in transmitting the masked entries to the third-party application as compared with transmitting the unmasked entries to the third-party application.

Additionally, or alternatively, the set of masks may include a mask that removes a type (e.g., one or more types) of entry from the structured data record. For example, some entries may be stored as "pending" entries, and the mask may remove all pending entries before remaining entries are transmitted to the third-party application. Removing entries reduces a size of the masked entries as compared with the unmasked entries. As a result, the server may consume less power, fewer processing resources, and fewer networking resources in transmitting the masked entries to the third-party application as compared with transmitting the unmasked entries to the third-party application.

Any of the masks described herein may be default masks. Accordingly, whenever the indication of the privacy setting is received, the server may apply at least a default mask (e.g., one or more default masks). Additionally, or alternatively, any of the masks described herein may be expressly indicated by the privacy setting.

As shown by reference number 140, the server may generate pseudo-random identifiers for the masked entries. For example, the server may execute a pseudo-random alphanumeric generator that calculates a unique pseudo-random identifier for each masked entry. A size (e.g., a length in characters or a size in bits or bytes) of each pseudo-random identifier may be a default size or may be based on a setting indicated by the user device (e.g., with the indication of the privacy setting, as described above) or indicated by the third-party application (e.g., during an initial setup procedure, as described in connection with FIG. 2, or with the request for information, as described above).

The server may further store the pseudo-random identifiers. The server may store the pseudo-random identifiers in association with the entries. Accordingly, each entry of the entries may be associated with a corresponding pseudo-random identifier of the pseudo-random identifiers. Thus, the server may use the pseudo-random identifiers to determine a correspondence between masked entries and unmasked entries, as described with respect to FIG. 1D in connection with reference number 165.

Additionally, in some implementations, the server may store the pseudo-random identifiers in association with an identifier (e.g., at least one identifier) of the third-party application. The identifier of the third-party application may include a name of the third-party application, a MAC address associated with the third-party application, and/or an IP address associated with the third-party application, among other examples. Thus, the server may use the identifier of the third-party application to determine whether to respond to a request including one of the pseudo-random identifiers, as described in connection with reference number 165.

As shown by reference number 145, the server may transmit, and the third-party application may receive, the masked entries in association with the pseudo-random identifiers. For example, the server may return the masked entries in response to an API call from the third-party application. The server may transmit the masked entries using the secure connection with the third-party application, as described above.

Accordingly, the third-party application may process the masked entries (e.g., by sorting the masked entries according to a budget associated with the user and/or by generating one or more visualizations based on the masked entries, among other examples). The third-party application may display a list of the masked entries to the user (e.g., via a UI shown on an output device associated with the user device). Therefore, the user may interact with a portion of the list associated with one of the masked entries. For example, the user may tap, click, or otherwise interact with a portion of the UI that is associated with a selected masked entry.

Figure 1D:
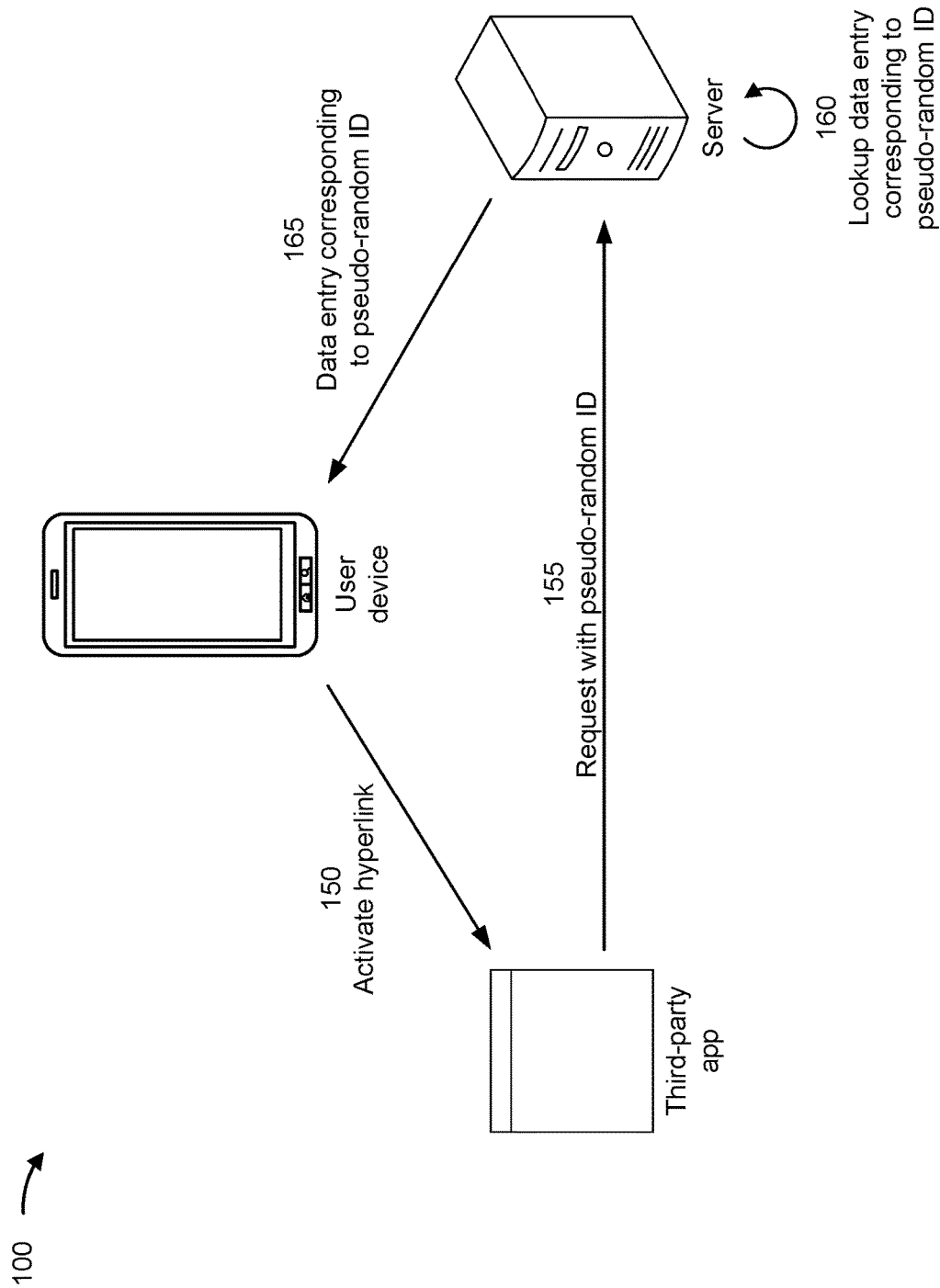

As shown in FIG. 1D and by reference number 150, the user device may activate a hyperlink associated with the selected masked entry. The activation may be in response to the user's interaction with the UI. The third-party application may transmit, and the server may receive, a request based on the hyperlink, as shown by reference number 155. The request may include an HTTP request, an API call, and/or another type of message transmitted to the server by the third-party application. In some implementations, the request may include a pseudo-random identifier that is associated with the selected masked entry. Accordingly, the server may identify the selected masked entry associated with the request, as shown by reference number 160.

As shown by reference number 165, the server may transmit, and the user device may receive (e.g., via an application, implemented on the user device, that is associated with a secure session with the server), the (unmasked) entry corresponding to the selected masked entry associated with the pseudo-random identifier. For example, the server may map (e.g., using a relational data structure or another similar type of data structure) the pseudo-random identifier included in the request to the unmasked entry. Accordingly, the server may return (e.g., in response to an API call based on the hyperlink) the unmasked entry.

As shown in FIG. 1D, the server may transmit the unmasked entry to an application on the user device that has a secure session with the server. For example, the application may be developed and/or maintained by the entity that manages the account of the user (and/or the entity that owns, or at least controls and manages, the server). Therefore, the user device may open the application, which is separate from the third-party application, in order to display the unmasked entry to the user. When the application does not have a current secure session with the server (e.g., because the application was closed by the user and/or did not send a keep alive packet to maintain a previous secure session with the server), the user device may initiate a new instance of the application, and the user may provide the credential associated with the account of the user. Accordingly, the application may establish a secure session with the server based on the credential provided by the user.

In some implementations, the request may additionally include an identifier of the third-party application (e.g., a name of the third-party application, a MAC address associated with the third-party application, and/or an IP address associated with the third-party application, among other examples). For example, the request may include a source field (e.g., in a header of the request, a body of the request, and/or in a different portion of a packet carrying at least part of the request). Therefore, the server may reject requests that include the pseudo-random identifier but indicate a source other than the third-party application. In other words, the server may transmit the unmasked entry based at least in part on mapping (e.g., using a relational data structure or another similar type of data structure) an identifier included in the source field to a stored identifier associated with the third-party application. As a result, security is increased because arbitrary applications are not permitted to trigger transmission of the unmasked entry.

By using techniques as described in connection with FIGS. 1A-1D, the server protects privacy of the user associated with the account by masking the entries in the structured data record associated with the account. Furthermore, the server reduces a size of the entries before transmitting the masked entries to the third-party application, which conserves power and processing resources at both the server and the third-party application. The reduced size further conserves networking resources as compared to networking resources that the server would otherwise have used to transmit the unmasked entries.

As indicated above, FIGS. 1A-1D are provided as an example. Other examples may differ from what is described with regard to FIGS. 1A-1D.

Figure 2:
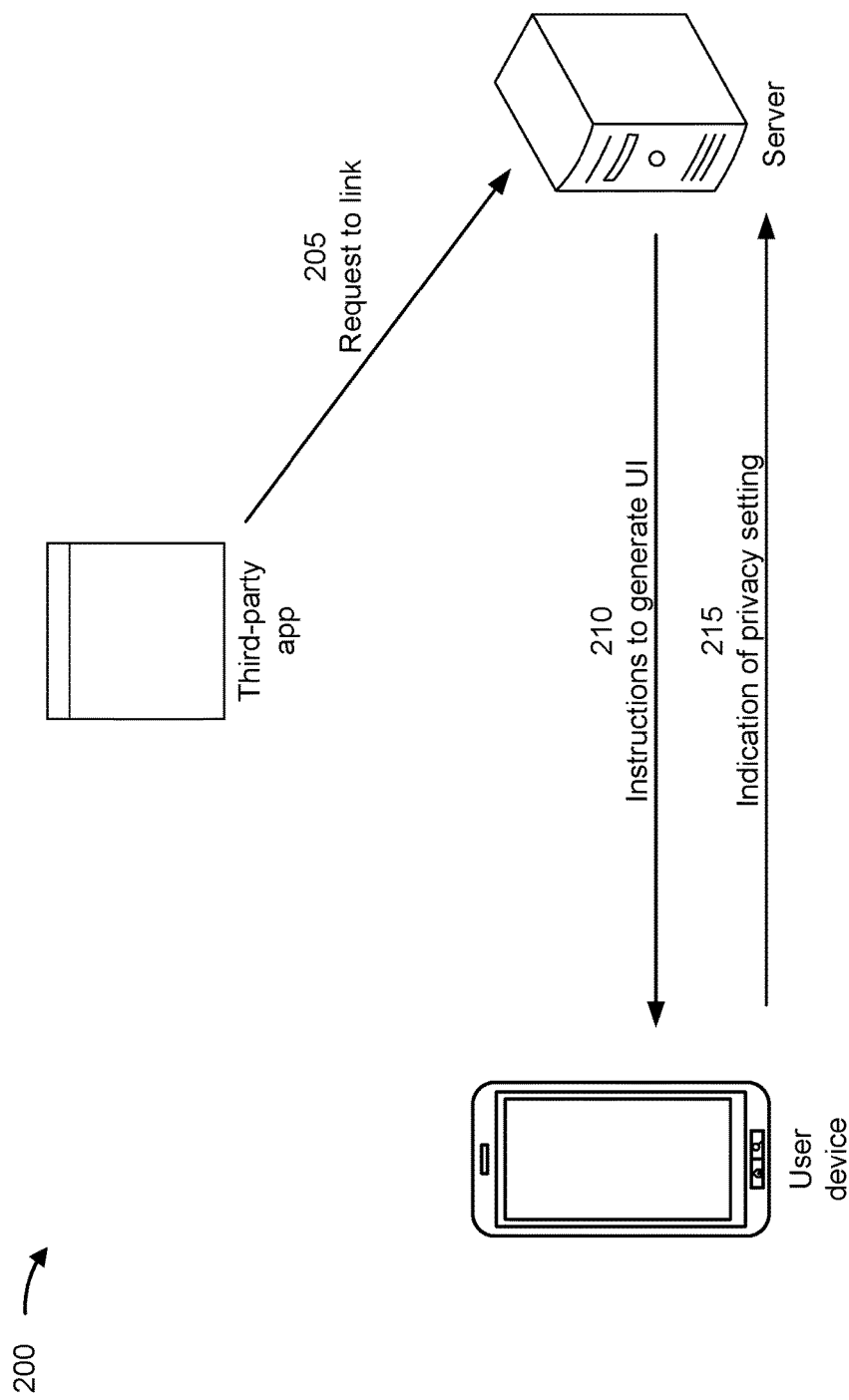
FIG. 2 is a diagram of an example implementation relating to receiving an indication of a privacy setting, in accordance with some embodiments of the present disclosure.

FIG. 2 is a diagram of an example 200 associated with receiving an indication of a privacy setting. As shown in FIG. 2, example 200 includes a server, a user device, and a third-party application (e.g., implemented on a third-party device). These devices are described in more detail in connection with FIGS. 6 and 7.

As shown by reference number 205, the third-party application may transmit, and the server may receive, a request to establish a link associated with an account of a user (e.g., of the user device). For example, the third-party application may receive input from the user (e.g., via a touchscreen, a mouse, a keyboard, and/or another type of input device associated with the user device) and transmit the request to the server in response to the input. For example, the user may provide information associated with the account of the user (e.g., an account number, a routing number, a name, and/or a type of account, among other examples) to the third-party application such that the third-party application transmits the request to the server in order to receive information associated with the account of the user.

In some implementations, the server may transmit, and the third-party application may receive, a credential (e.g., at least one credential). For example, the credential may include a key, a certificate, and/or another type of information assigned from the server to the third-party application, among other examples. Accordingly, the server and the third-party application may establish a secure connection using the credential, as described in connection with FIG. 1B.

Figure 4A:
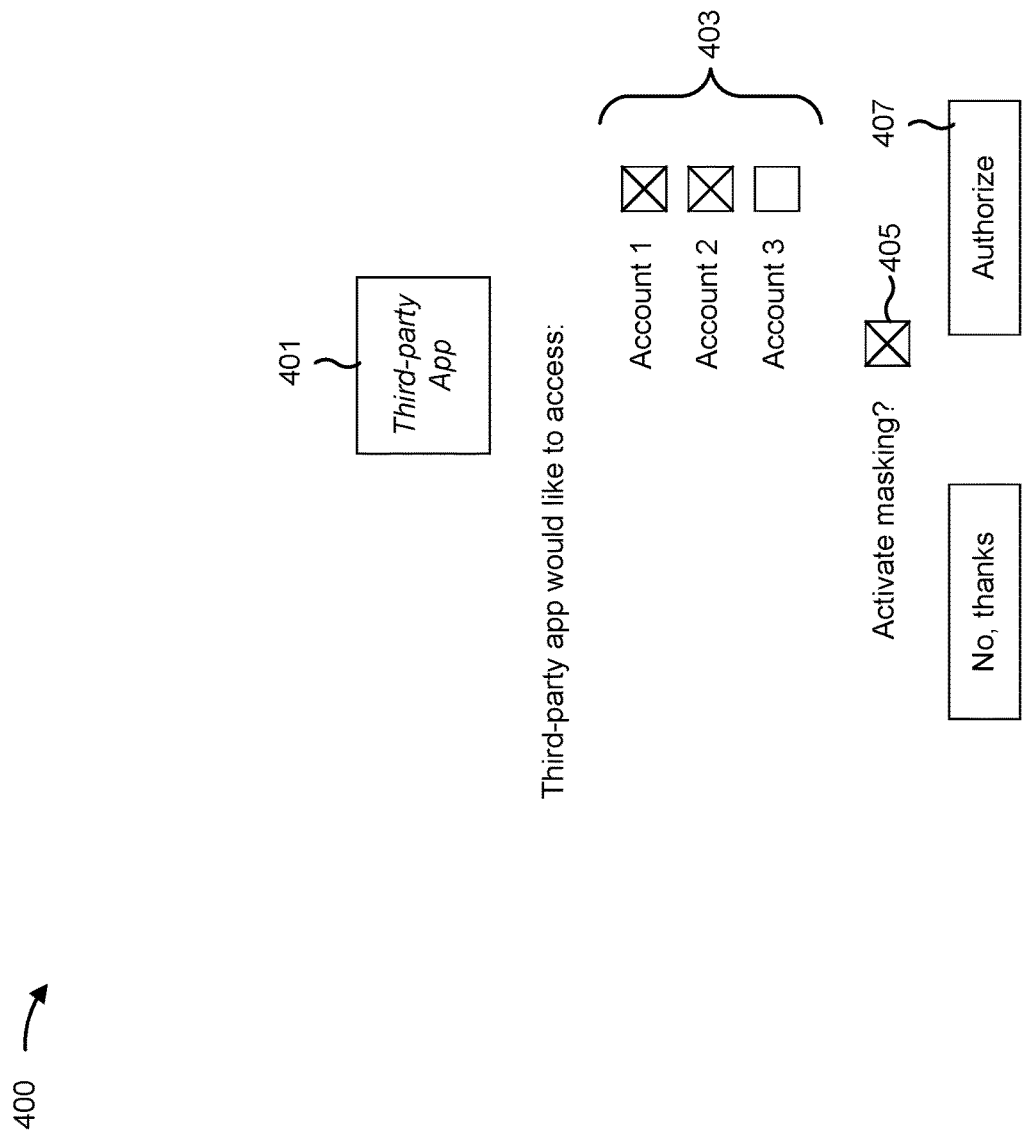
Figure 4B:
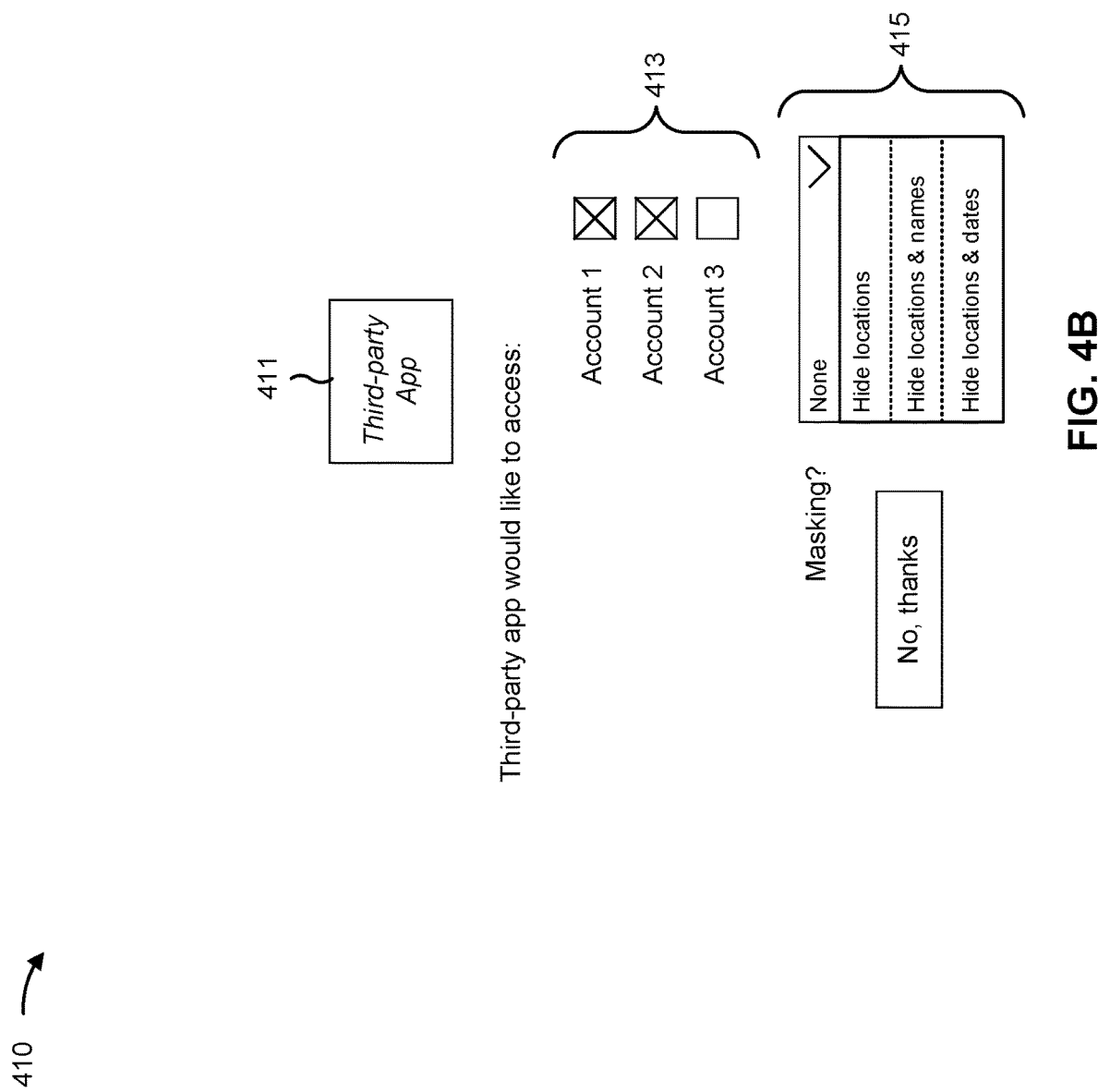

As shown by reference number 210, the server may transmit, and the user device may receive, instructions to generate a UI. For example, the instructions may be for generating a UI as shown in FIG. 4A, FIG. 4B, or FIG. 4C. The server may transmit the instructions in response to the request for the third-party application. For example, the server may determine (e.g., using a relational data structure or another similar type of data structure) that information included in the request from the third-party application is associated with the account of the user. Accordingly, the server may determine (e.g., using a relational data structure or another similar type of data structure) that the account is associated with an identifier of the user device (e.g., a name of the user device, a MAC address of the user device, an IP address of the user device, and/or a phone number associated with the user device, among other examples). For example, the user may have previously indicated the user device to the server (e.g., during a registration procedure).

Accordingly, the user device may display (e.g., via an output device associated with the user device) the UI, and the user may interact with the UI to generate the indication of the privacy setting. For example, the user may use one or more checkboxes (e.g., as shown in FIGS. 4A and 4C) or a drop-down menu (e.g., as shown in FIG. 4B), among other examples, to generate the indication of the privacy setting.

Accordingly, the user device may transmit, and the server may receive, the indication of the privacy setting, as shown by reference number 215. In some implementations, the user device may additionally transmit, and the server may receive, an authorization for the third-party application to establish the link. For example, the user may use a button (e.g., as shown in FIGS. 4A, 4B, and 4C), among other examples, to authorize the third-party application.

The server may generate an endpoint for an API function for the third-party application to use based on the authorization. Accordingly, the server may transmit, and the third-party application may receive, an indication of the endpoint (e.g., an IP address and/or another type of indication). The server may additionally store the indication of the privacy setting in association with the indication of the endpoint. Accordingly, the server may apply a set of masks, based on the privacy setting as described in connection with FIG. 1C, whenever responding to a call to the API function via the endpoint.

As indicated above, FIG. 2 is provided as an example. Other examples may differ from what is described with regard to FIG. 2.

FIG. 3 is a diagram of an example 300 associated with receiving an indication of a privacy setting. As shown in FIG. 3, example 300 includes a server and a user device. These devices are described in more detail in connection with FIGS. 6 and 7.

As shown by reference number 305, the user device may transmit, and the server may receive, a request to view settings associated with an account of a user (e.g., of the user device). For example, the user device may receive input from the user (e.g., via a touchscreen, a mouse, a keyboard, and/or another type of input device associated with the user device) and navigate to a website (e.g., using a web browser implemented on the user device) in response to the input. The website may be hosted by, or at least associated with, the server. Accordingly, the user may interact with the website in order to trigger the user device to transmit the request to the server (e.g., via an HTTP request, an API call, and/or another similar type of request).

In some implementations, the user device may transmit, and the server may receive, a credential (e.g., at least one credential). For example, the credential may include a username and password, a passcode, a PIN, a biometric indicator associated with the user, and/or another type of information uniquely associated with the user, among other examples. Accordingly, the server and the user device may establish a secure connection using the credential, as described in connection with FIG. 1A. The request to view settings may be transmitted by the user device, and received by the server, over the secure connection.

Figure 5A:
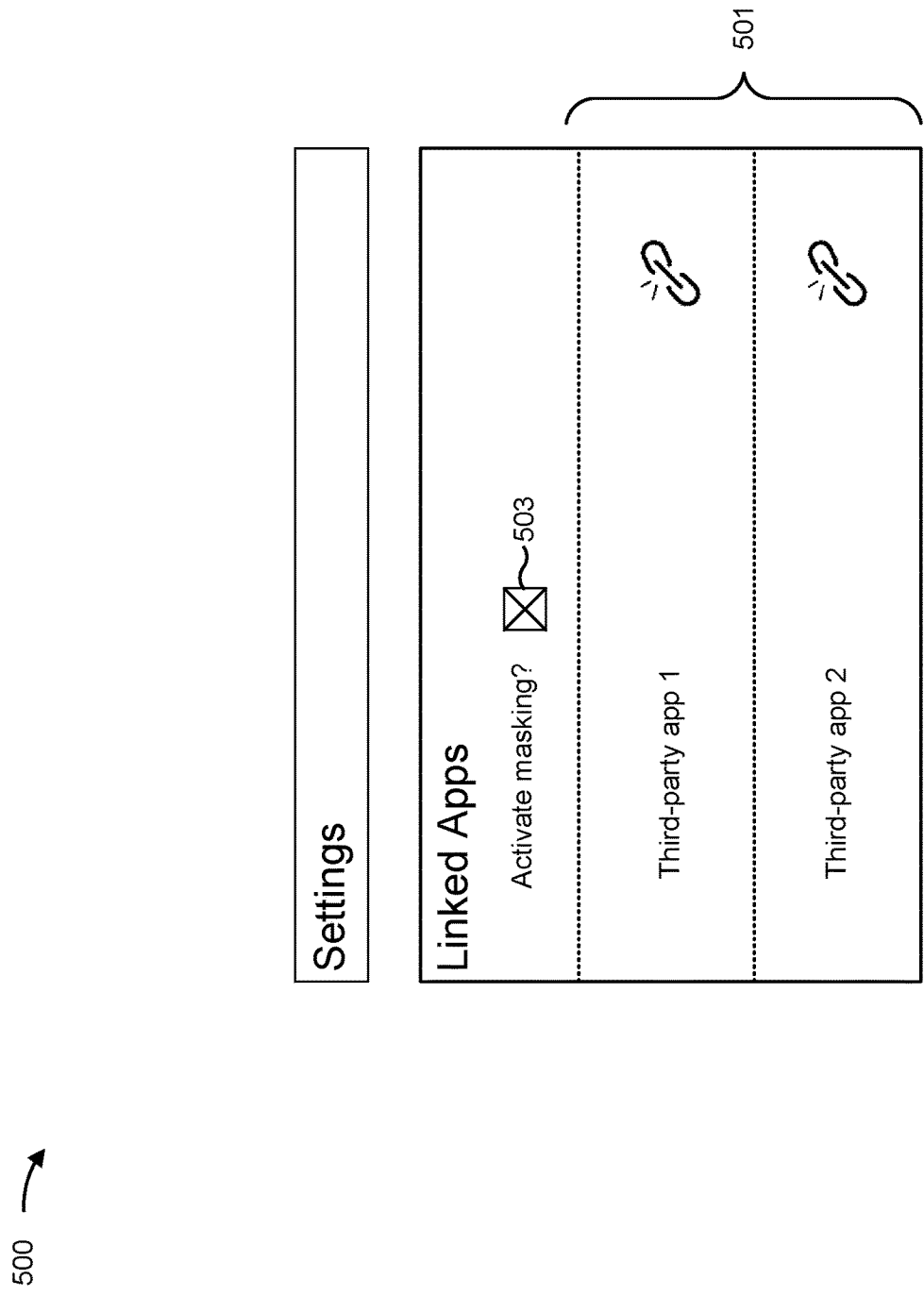
FIGS. 5A-5C are diagrams of example UIs, in accordance with some embodiments of the present disclosure.
Figure 5B:
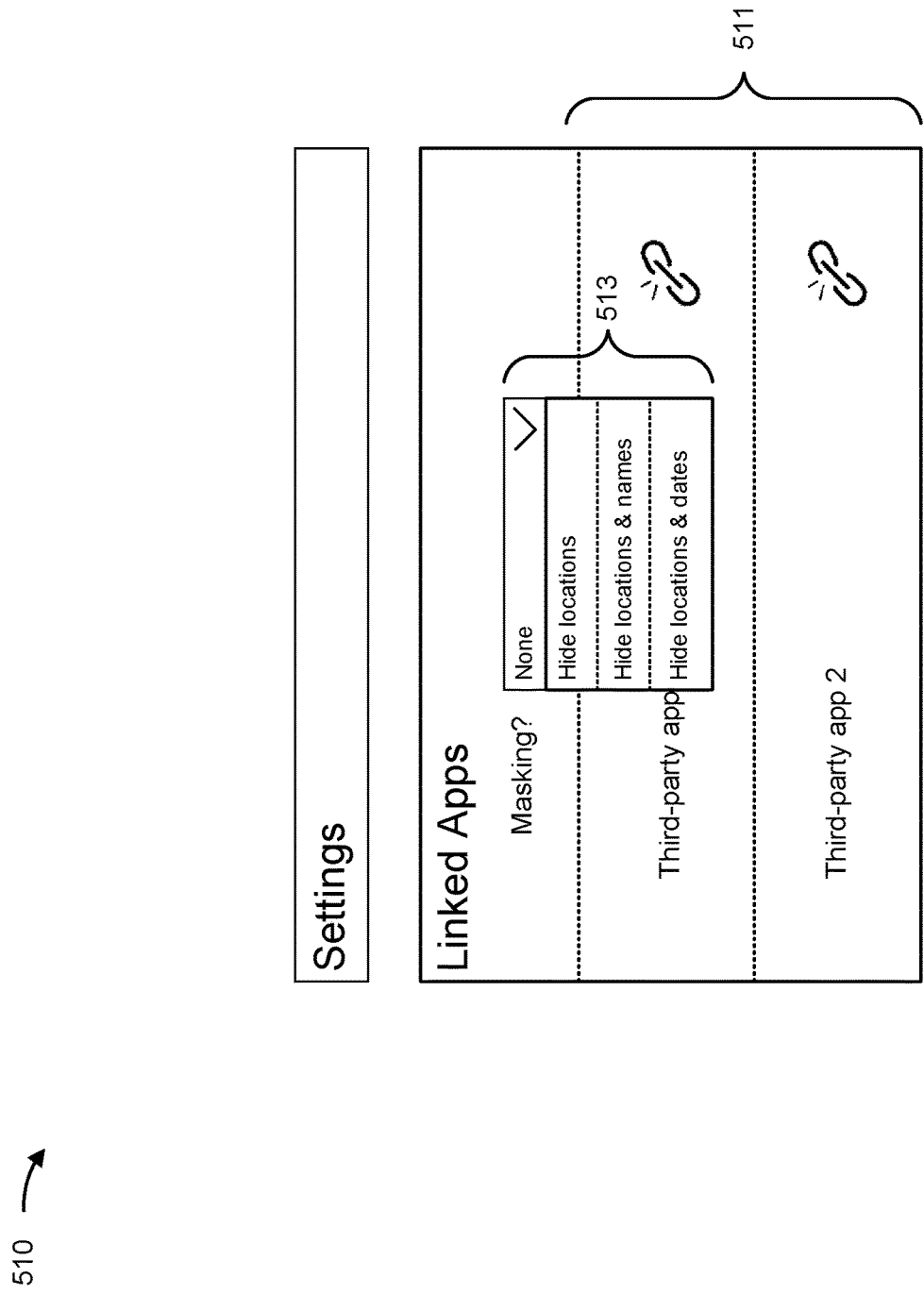
Figure 5C:
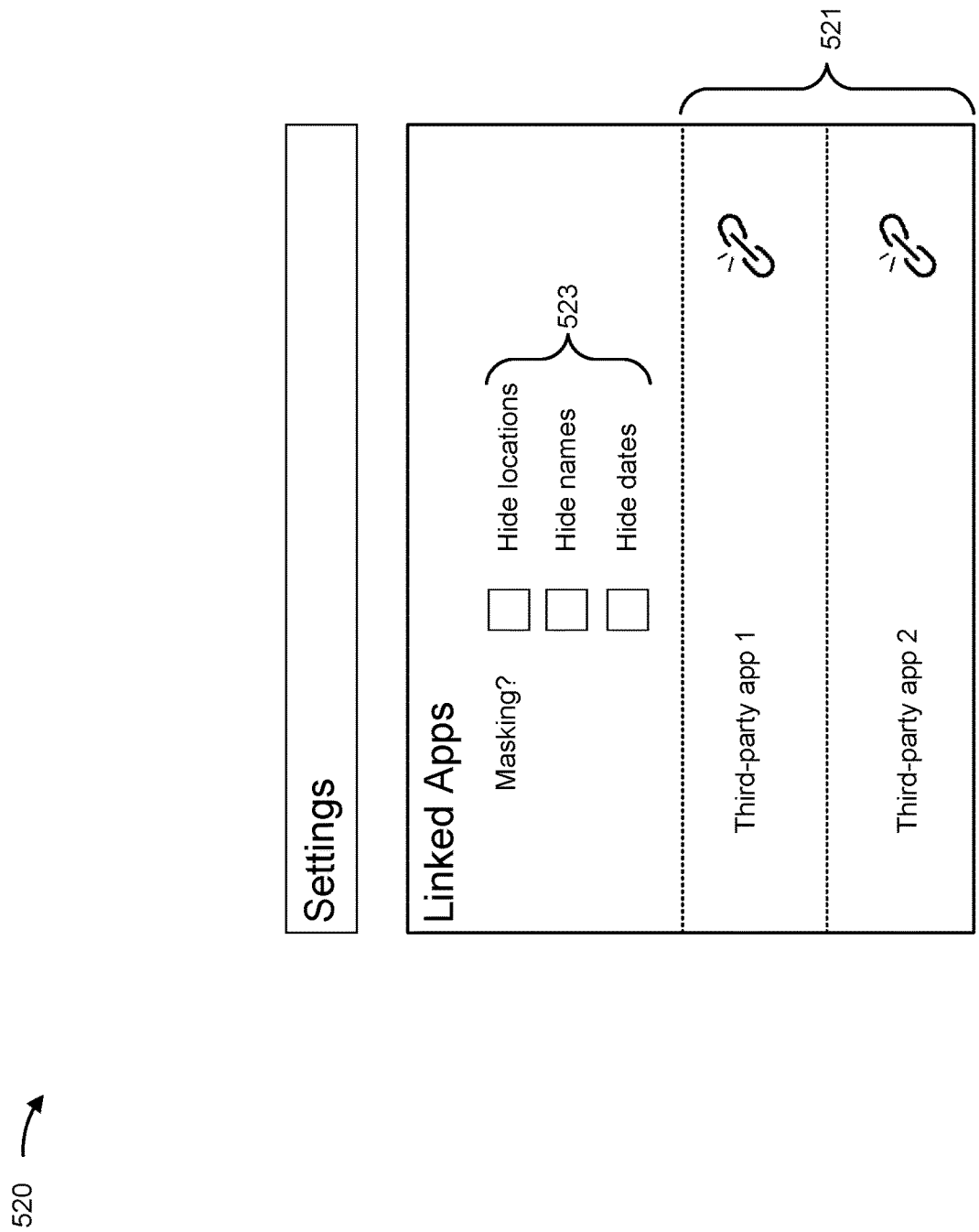

As shown by reference number 310, the server may transmit, and the user device may receive, instructions to generate a UI. For example, the instructions may be for generating a UI as shown in FIG. 5A, FIG. 5B, or FIG. 5C. The server may transmit the instructions in response to the request to view settings. For example, the server may determine (e.g., using a relational data structure or another similar type of data structure) that information included in the request from the user device is associated with the account of the user and may transmit the instructions such that the UI indicates a list of third-party applications associated with the account of the user (e.g., based on previous authorization processes, such as the process described in connection with FIG. 2).

Accordingly, the user device may display (e.g., via an output device associated with the user device) the UI, and the user may interact with the UI to generate the indication of the privacy setting. For example, the user may use one or more checkboxes (e.g., as shown in FIGS. 5A and 5C) or a drop-down menu (e.g., as shown in FIG. 5B), among other examples, to generate the indication of the privacy setting. Accordingly, the user device may transmit, and the server may receive, the indication of the privacy setting, as shown by reference number 315.

The server may modify an endpoint for an API function for a third-party application to use based on the indication of the privacy setting. For example, the server may store the indication of the privacy setting in association with the indication of the endpoint. Accordingly, the server may apply a set of masks, based on the privacy setting as described in connection with FIG. 1C, whenever responding to a call to the API function via the endpoint.

As indicated above, FIG. 3 is provided as an example. Other examples may differ from what is described with regard to FIG. 3.

FIGS. 4A, 4B, and 4C are diagrams of example UIs 400, 410, and 420, respectively, associated with receiving an indication of a privacy setting. Examples 400, 410, and 420 may be displayed using a user device based on instructions from a server. These devices are described in more detail in connection with FIGS. 6 and 7.

As shown in FIG. 4A, the example UI 400 may include an indication 401 of a third-party application (e.g., that is requesting to establish a link with a set of accounts of a user, as described in connection with FIG. 2). The indication 401 may include text associated with the third-party application, a logo associated with the third-party application, and/or another type of visual indicator associated with the third-party application. The example UI 400 may further include a set of checkboxes 403 (or another type of input element) associated with the set of accounts of the user. Accordingly, the user may authorize the third-party application to access the set of accounts (or a subset of the set of accounts) using the set of checkboxes 403.

The example UI 400 may further include a checkbox 405 (or another type of input element) associated with activation of masking for the third-party application. Accordingly, the user may activate default masks (e.g., as described in connection with FIG. 1C) using the checkbox 405. The example UI 400 may include a button 407 (or another type of input element) that authorizes the third-party application. The button 407 may be used to trigger the server to authorize the third-party application to access the set of accounts (or a subset of the set of accounts) based on the set of checkboxes 403 and may trigger association of an API endpoint for the third-party application with the default masks based on the checkbox 405.

As shown in FIG. 4B, the example UI 410 includes an indication 411 of a third-party application, similar to indication 401 of FIG. 4A. Additionally, the example UI 410 includes a set of checkboxes 413 (or another type of input element) associated with the set of accounts of the user, similar to the set of checkboxes 403 of FIG. 4A.

The example UI 410 may further include a drop-down menu 415 (or another type of input element) associated with activation of masking for the third-party application. Accordingly, the user may activate different sets of masks (e.g., as described in connection with FIG. 1C) using the drop-down menu 415. In the example UI 410 of FIG. 4B, the drop-down menu 415 has one option ("None") associated with no masking, one option ("Hide locations") associated with a mask that removes location indicators or replaces location indicators with geographic area indicators, one option ("Hide locations & names") associated with a mask that replaces entity names with categories as well as a mask that removes location indicators or replaces location indicators with geographic area indicators, and one option ("Hide locations & dates") associated with a mask that replaces date indicators with month indicators as well as a mask that removes location indicators or replaces location indicators with geographic area indicators. Other combinations of the masks as described in connection with FIG. 1C may be provided as options in the drop-down menu 415.

The example UI 410 may further include a button (or another type of input element) that is obscured by the drop-down menu 415 in FIG. 4B. The button may be similar to the button 407 of FIG. 4A. For example, the button may be used to trigger the server to authorize the third-party application to access the set of accounts (or a subset of the set of accounts) based on the set of checkboxes 413 and may trigger association of an API endpoint for the third-party application with the selected masks based on the drop-down menu 415.

As shown in FIG. 4C, the example UI 420 includes an indication 421 of a third-party application, similar to indication 401 of FIG. 4A. Additionally, the example UI 420 includes a set of checkboxes 423 (or another type of input element) associated with the set of accounts of the user, similar to the set of checkboxes 403 of FIG. 4A.

The example UI 420 may further include a set of checkboxes 425 (or another type of input element) associated with activation of masking for the third-party application. Accordingly, the user may activate different masks (e.g., as described in connection with FIG. 1C) using the set of checkboxes 425. In the example UI 420 of FIG. 4C, the set of checkboxes 425 allows the user to activate a mask that removes location indicators or replaces location indicators with geographic area indicators (using the checkbox labeled "Hide locations"), a mask that replaces entity names with categories (using the checkbox labeled "Hide names"), and/or a mask that replaces date indicators with month indicators (using the checkbox labeled "Hide dates"). Other masks as described in connection with FIG. 1C may be provided as options in the set of checkboxes 425.

The example UI 420 may further include a button 427 (or another type of input element), similar to the button 407 of FIG. 4A. For example, the button 427 may be used to trigger the server to authorize the third-party application to access the set of accounts (or a subset of the set of accounts) based on the set of checkboxes 423 and may trigger association of an API endpoint for the third-party application with the selected masks based on the set of checkboxes 425.

As indicated above, FIGS. 4A-4C are provided as examples. Other examples may differ from what is described with regard to FIGS. 4A-4C.

FIGS. 5A, 5B, and 5C are diagrams of example UIs 500, 510, and 520, respectively, associated with receiving an indication of a privacy setting. Examples 500, 510, and 520 may be displayed using a user device based on instructions from a server. These devices are described in more detail in connection with FIGS. 6 and 7.

As shown in FIG. 5A, the example UI 500 may include indications 501 of third-party applications (e.g., that are authorized to access an account of a user). The indications 501 may include text associated with the third-party applications, logos associated with the third-party applications, and/or other types of visual indicators associated with the third-party applications.

The example UI 500 may further include a checkbox 503 (or another type of input element) associated with activation of masking for the third-party applications. Accordingly, the user may activate default masks (e.g., as described in connection with FIG. 1C) using the checkbox 503. Thus, the example UI 500 may be used to trigger the server to associate API endpoints for the third-party applications with the default masks based on the checkbox 503.

As shown in FIG. 5B, the example UI 510 includes indications 511 of third-party applications, similar to indications 501 of FIG. 5A. The example UI 510 may further include a drop-down menu 513 (or another type of input element) associated with activation of masking for the third-party applications. Accordingly, the user may activate different sets of masks (e.g., as described in connection with FIG. 1C) using the drop-down menu 513. In the example UI 510 of FIG. 5B, the drop-down menu 513 has one option ("None") associated with no masking, one option ("Hide locations") associated with a mask that removes location indicators or replaces location indicators with geographic area indicators, one option ("Hide locations & names") associated with a mask that replaces entity names with categories as well as a mask that removes location indicators or replaces location indicators with geographic area indicators, and one option ("Hide locations & dates") associated with a mask that replaces date indicators with month indicators as well as a mask that removes location indicators or replaces location indicators with geographic area indicators. Other combinations of the masks as described in connection with FIG. 1C may be provided as options in the drop-down menu 513. Thus, the example UI 510 may be used to trigger the server to associate API endpoints for the third-party applications with the selected masks based on the drop-down menu 513.

As shown in FIG. 5C, the example UI 520 includes indications 521 of third-party applications, similar to indications 501 of FIG. 5A. The example UI 520 may further include a set of checkboxes 523 (or another type of input element) associated with activation of masking for the third-party applications. Accordingly, the user may activate different masks (e.g., as described in connection with FIG. 1C) using the set of checkboxes 523. In the example UI 520 of FIG. 5C, the set of checkboxes 523 allows the user to activate a mask that removes location indicators or replaces location indicators with geographic area indicators (using the checkbox labeled "Hide locations"), a mask that replaces entity names with categories (using the checkbox labeled "Hide names"), and/or a mask that replaces date indicators with month indicators (using the checkbox labeled "Hide dates"). Other masks as described in connection with FIG. 1C may be provided as options in the set of checkboxes 523. Thus, the example UI 520 may be used to trigger the server to associate API endpoints for the third-party applications with the selected masks based on the set of checkboxes 523.

As indicated above, FIGS. 5A-5C are provided as examples. Other examples may differ from what is described with regard to FIGS. 5A-5C.

Figure 6:
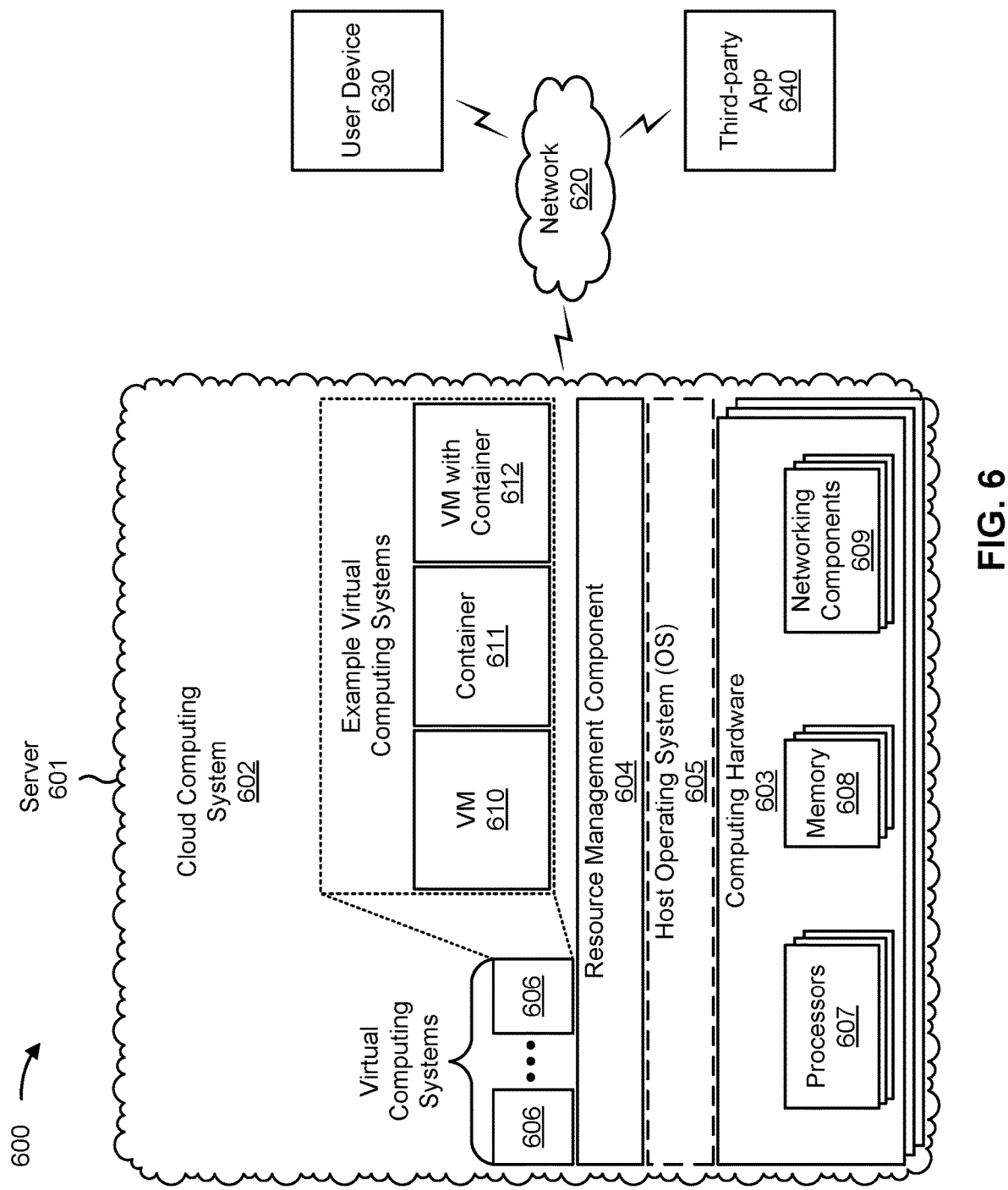
FIG. 6 is a diagram of an example environment in which systems and/or methods described herein may be implemented, in accordance with some embodiments of the present disclosure.

FIG. 6 is a diagram of an example environment 600 in which systems and/or methods described herein may be implemented. As shown in FIG. 6, environment 600 may include a server 601, which may include one or more elements of and/or may execute within a cloud computing system 602. The cloud computing system 602 may include one or more elements 603-612, as described in more detail below. As further shown in FIG. 6, environment 600 may include a network 620, a user device 630, and/or a device implementing a third-party application ("app") 640. Devices and/or elements of environment 600 may interconnect via wired connections and/or wireless connections.

The cloud computing system 602 may include computing hardware 603, a resource management component 604, a host operating system (OS) 605, and/or one or more virtual computing systems 606. The cloud computing system 602 may execute on, for example, an Amazon Web Services platform, a Microsoft Azure platform, or a Snowflake platform. The resource management component 604 may perform virtualization (e.g., abstraction) of computing hardware 603 to create the one or more virtual computing systems 606. Using virtualization, the resource management component 604 enables a single computing device (e.g., a computer or a server) to operate like multiple computing devices, such as by creating multiple isolated virtual computing systems 606 from computing hardware 603 of the single computing device. In this way, computing hardware 603 can operate more efficiently, with lower power consumption, higher reliability, higher availability, higher utilization, greater flexibility, and lower cost than using separate computing devices.

The computing hardware 603 may include hardware and corresponding resources from one or more computing devices. For example, computing hardware 603 may include hardware from a single computing device (e.g., a single server) or from multiple computing devices (e.g., multiple servers), such as multiple computing devices in one or more data centers. As shown, computing hardware 603 may include one or more processors 607, one or more memories 608, and/or one or more networking components 609. Examples of a processor, a memory, and a networking component (e.g., a communication component) are described elsewhere herein.

The resource management component 604 may include a virtualization application (e.g., executing on hardware, such as computing hardware 603) capable of virtualizing computing hardware 603 to start, stop, and/or manage one or more virtual computing systems 606. For example, the resource management component 604 may include a hypervisor (e.g., a bare-metal or Type 1 hypervisor, a hosted or Type 2 hypervisor, or another type of hypervisor) or a virtual machine monitor, such as when the virtual computing systems 606 are virtual machines 610. Additionally, or alternatively, the resource management component 604 may include a container manager, such as when the virtual computing systems 606 are containers 611. In some implementations, the resource management component 604 executes within and/or in coordination with a host operating system 605.

A virtual computing system 606 may include a virtual environment that enables cloud-based execution of operations and/or processes described herein using computing hardware 603. As shown, a virtual computing system 606 may include a virtual machine 610, a container 611, or a hybrid environment 612 that includes a virtual machine and a container, among other examples. A virtual computing system 606 may execute one or more applications using a file system that includes binary files, software libraries, and/or other resources required to execute applications on a guest operating system (e.g., within the virtual computing system 606) or the host operating system 605.

Although the server 601 may include one or more elements 603-612 of the cloud computing system 602, may execute within the cloud computing system 602, and/or may be hosted within the cloud computing system 602, in some implementations, the server 601 may not be cloud-based (e.g., may be implemented outside of a cloud computing system) or may be partially cloud-based. For example, the server 601 may include one or more devices that are not part of the cloud computing system 602, such as device 700 of FIG. 7, which may include a standalone server or another type of computing device. The server 601 may perform one or more operations and/or processes described in more detail elsewhere herein.

The network 620 may include one or more wired and/or wireless networks. For example, the network 620 may include a cellular network, a public land mobile network (PLMN), a local area network (LAN), a wide area network (WAN), a private network, the Internet, and/or a combination of these or other types of networks. The network 620 enables communication among the devices of the environment 600.

The user device 630 may include one or more devices capable of receiving, generating, storing, processing, and/or providing information associated with structured data records, as described elsewhere herein. The user device 630 may include a communication device and/or a computing device. For example, the user device 630 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The third-party application ("app") 640 may be implemented on one or more devices capable of receiving, generating, storing, processing, and/or providing information associated with structured data records, as described elsewhere herein. The third-party app 640 may be implemented on a communication device and/or a computing device. For example, the third-party app 640 may be implemented on a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 630 and the device implementing the third-party app 640 may be the same device.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of the environment 600 may perform one or more functions described as being performed by another set of devices of the environment 600.

Figure 7:
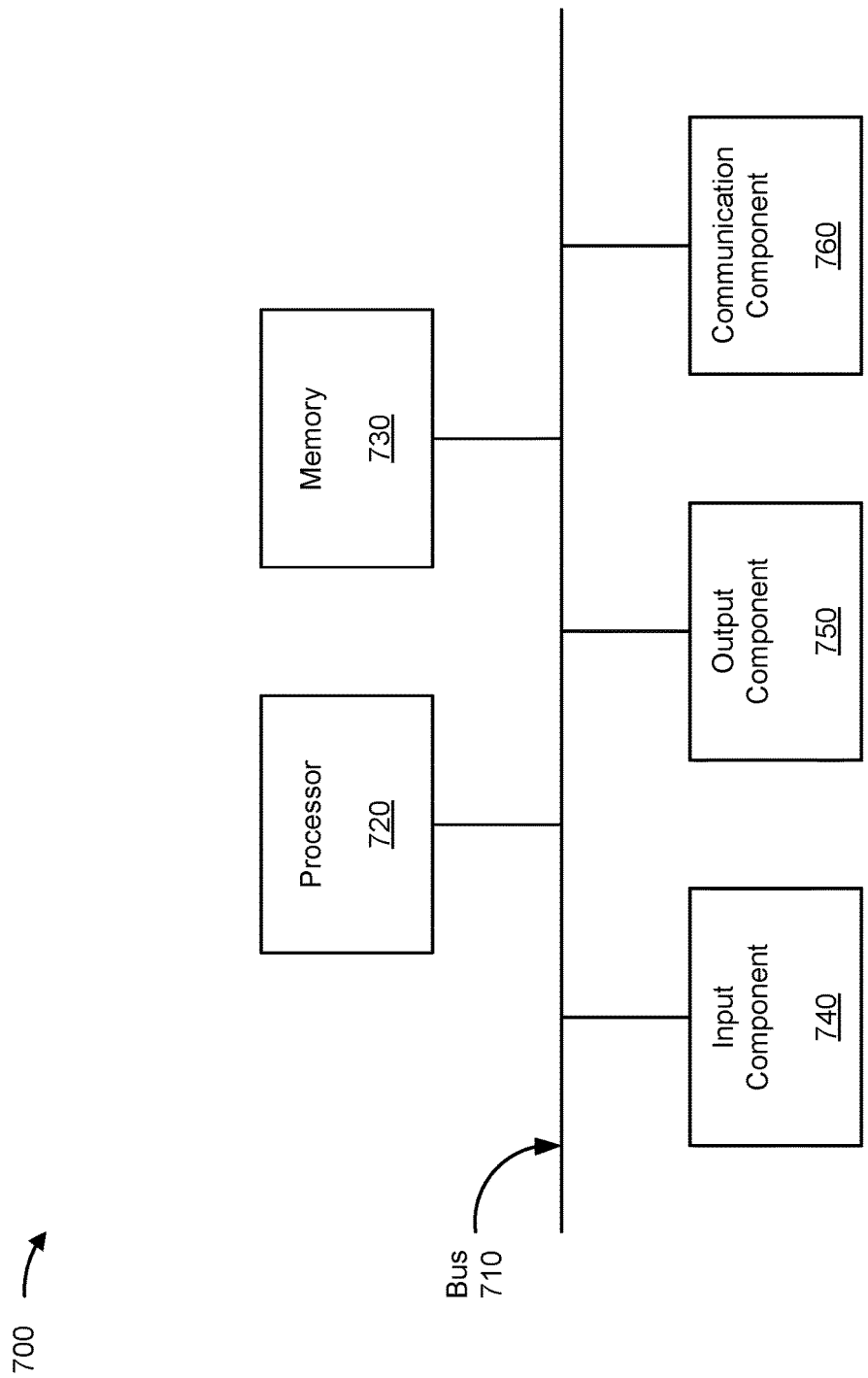
FIG. 7 is a diagram of example components of one or more devices of FIG. 6, in accordance with some embodiments of the present disclosure.

FIG. 7 is a diagram of example components of a device 700 associated with securing structured data records for external parties. The device 700 may correspond to a user device 630 and/or a device implementing a third-party app 640. In some implementations, the user device 630 and/or the device implementing the third-party app 640 may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
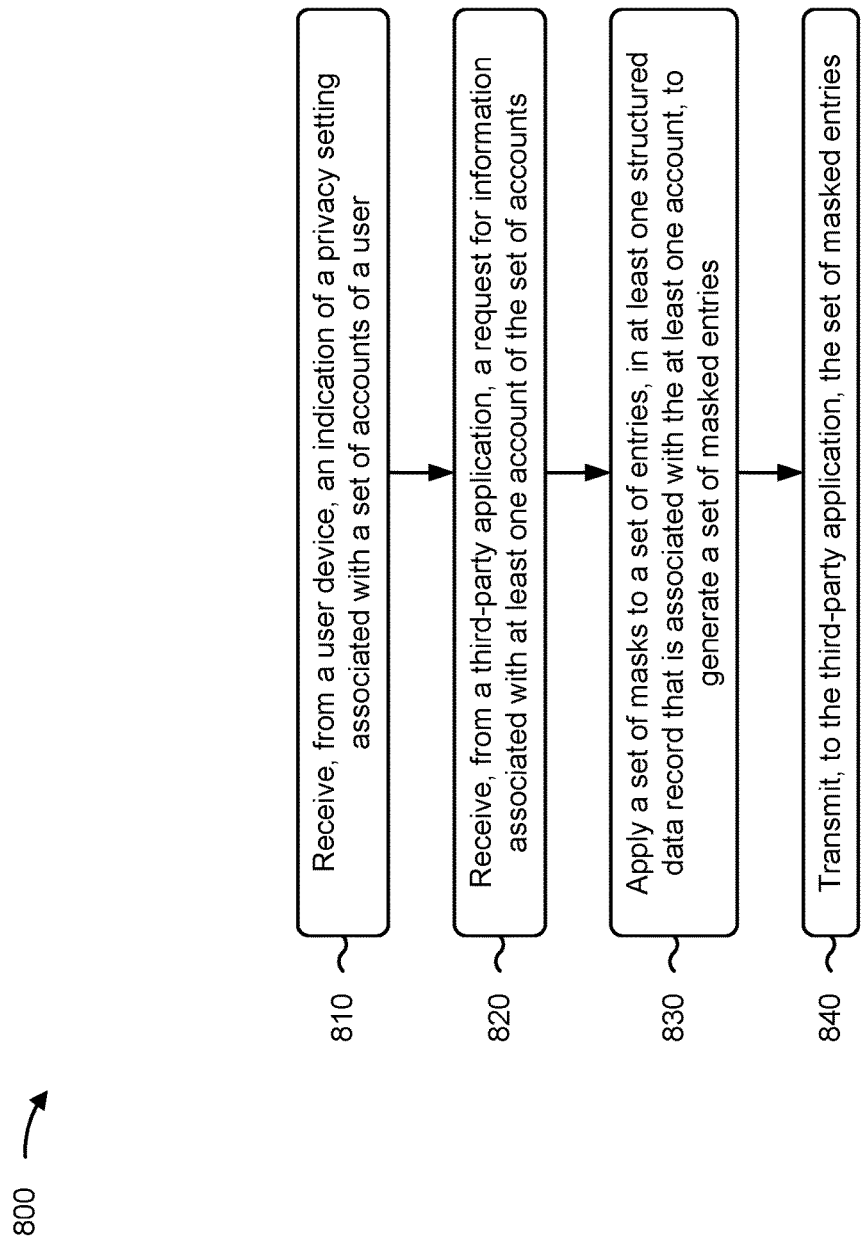
FIG. 8 is a flowchart of an example process relating to securing structured data records for external parties, in accordance with some embodiments of the present disclosure.

FIG. 8 is a flowchart of an example process 800 associated with securing structured data records for external parties. In some implementations, one or more process blocks of FIG. 8 may be performed by the server 601. In some implementations, one or more process blocks of FIG. 8 may be performed by another device or a group of devices separate from or including the server 601, such as a user device 630 and/or a device implementing a third-party app 640. Additionally, or alternatively, one or more process blocks of FIG. 8 may be performed by one or more components of the device 700, such as processor 720, memory 730, input component 740, output component 750, and/or communication component 760.

As shown in FIG. 8, process 800 may include receiving, from a user device, an indication of a privacy setting associated with a set of accounts of a user (block 810). For example, the server 601 (e.g., using processor 720, memory 730, input component 740, and/or communication component 760) may receive, from a user device, an indication of a privacy setting associated with a set of accounts of a user, as described above in connection with reference number 115 of FIG. 1A. As an example, a user may trigger transmission of the indication of the privacy setting using a UI associated with a request from a third-party application, as described in connection with FIGS. 2 and 4A-4C. Alternatively, the user may trigger transmission of the indication of the privacy setting using a UI associated with settings for the set of accounts of the user, as described in connection with FIGS. 3 and 5A-5C.

As further shown in FIG. 8, process 800 may include receiving, from a third-party application, a request for information associated with at least one account of the set of accounts (block 820). For example, the server 601 (e.g., using processor 720, memory 730, input component 740, and/or communication component 760) may receive, from a third-party application, a request for information associated with at least one account of the set of accounts, as described above in connection with reference number 130 of FIG. 1B. As an example, the user may provide input (e.g., interacting with a UI of the third-party application) to trigger the third-party application to transmit the request. Alternatively, the third-party application may transmit the request to the server based on a schedule associated with updating information associated with the set of accounts.

As further shown in FIG. 8, process 800 may include applying a set of masks to a set of entries in at least one structured data record that is associated with the at least one account, to generate a set of masked entries (block 830). For example, the server 601 (e.g., using processor 720 and/or memory 730) may apply a set of masks to a set of entries in at least one structured data record that is associated with the at least one account, to generate a set of masked entries, as described above in connection with reference number 135 of FIG. 1C. As an example, the set of masks may include a mask that removes a set of transaction identifiers included in the set of entries, a mask that replaces a set of entity names included in the set of entries with a set of categories corresponding to the set of entity names, a mask that removes a set of location indicators included in the set of entries, a mask that replaces a set of location indicators included in the set of entries with a set of geographic area indicators corresponding to the set of location indicators, a mask that replaces a set of date indicators included in the set of entries with a set of month indicators corresponding to the set of date indicators, a mask that removes a set of time indicators included in the set of entries, and/or a mask that removes one or more types of entries from the set of entries.

As further shown in FIG. 8, process 800 may include transmitting, to the third-party application, the set of masked entries (block 840). For example, the server 601 (e.g., using processor 720, memory 730, and/or communication component 760) may transmit, to the third-party application, the set of masked entries, as described above in connection with reference number 145 of FIG. 1C. As an example, the server may return the set of masked entries in response to an API call from the third-party application. The server may transmit the set of masked entries using a secure connection with the third-party application.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel. The process 800 is an example of one process that may be performed by one or more devices described herein. These one or more devices may perform one or more other processes based on operations described herein, such as the operations described in connection with FIGS. 1A-1D, 2, 3, 4A-4C, and 5A-5C. Moreover, while the process 800 has been described in relation to the devices and components of the preceding figures, the process 800 can be performed using alternative, additional, or fewer devices and/or components. Thus, the process 800 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for securing structured data records provided to external parties, the system comprising:
   one or more memories; and
   one or more processors, communicatively coupled to the one or more memories, configured to:
   receive, from a third-party application, at least one credential;
   establish a secure connection with the third-party application based on the at least one credential;
   receive, from a user device, an indication of a privacy setting associated with one or more accounts of a user;
   receive, from the third-party application and using the secure connection, a request for information associated with the one or more accounts of the user;
   apply one or more masks to entries in one or more structured data records that are associated with the one or more accounts of the user, to generate masked entries, wherein the one or more masks are selected based on the indication of the privacy setting;
   generate pseudo-random identifiers for the masked entries;
   transmit, to the third-party application, the masked entries in association with the pseudo-random identifiers;
   receive another request including a pseudo-random identifier of the pseudo-random identifiers; and
   reject the request based on the request indicating a source other than the third-party application.

2. The system of claim 1, wherein the one or more processors are further configured to:
   receive a request based on a hyperlink, associated with the third-party application, including a pseudo-random identifier of the pseudo-random identifiers; and
   transmit, to an application associated with a secure session related to the secure connection, one of the entries corresponding to one of the masked entries associated with the pseudo-random identifier.

3. The system of claim 1, wherein the one or more processors are further configured to:
   store the pseudo-random identifiers in association with the entries, wherein each entry of the entries is associated with a corresponding pseudo-random identifier of the pseudo-random identifiers.

4. The system of claim 1, wherein the one or more processors are further configured to:
   store the pseudo-random identifiers in association with at least one identifier of the third-party application, wherein the request indicates the source other than the third-party application by including an identifier other than the at least one identifier of the third-party application.

5. The system of claim 1, wherein the one or more structured data records comprise one or more transaction records for the one or more accounts.

6. The system of claim 1, wherein the one or more processors, to apply the one or more masks, are configured to at least one of:
replace a set of entity names, included in the set of entries, with a set of categories corresponding to the set of entity names,
remove a set of transaction identifiers included in the set of entries, or
remove a set of location indicators included in the set of entries.

7. The system of claim 1, wherein the privacy setting includes one or more options associated with a type of information to be masked.

8. The system of claim 1, wherein the privacy setting includes one or more options associated with a privacy mode.

9. A method of securing structured data records provided to external parties, comprising:
receiving, from a third-party application, at least one credential;
establishing a secure connection with the third-party application based on the at least one credential;
receiving, from a user device, a request to view settings associated with an account of the user;
transmitting, to the user device, instructions to generate a user interface,
wherein an indication of a privacy setting is received using the user interface;
receiving, from the user device, the indication of the privacy setting associated with the account of a user;
receiving, from the third-party application and using the secure connection, a request for information associated with the account of the user;
applying, by a server, one or more masks to entries in a structured data record that is associated with the account of the user, to generate masked entries;
generating, by the server, pseudo-random identifiers for the masked entries; and
transmitting, to the third-party application, the masked entries in association with the pseudo-random identifiers.

10. The method of claim 9, further comprising:
receiving, from the user device, at least one credential associated with the user; and
establishing the secure connection with the user device based on the at least one credential associated with the user,
wherein the indication of the privacy setting is received using the secure connection.

11. The method of claim 9, further comprising:
receiving, from the third-party application, a request to establish a link associated with the account of the user; and
transmitting, to the user device, instructions to generate a user interface,
wherein the indication of the privacy setting is received using the user interface.

12. The method of claim 11, further comprising:
receiving, from the user device, an authorization for the third-party application to establish the link using the user interface.

13. The method of claim 11, wherein the indication of the privacy setting is received using a checkbox or a drop-down menu of the user interface.

14. The method of claim 9, wherein the indication of the privacy setting is received using a checkbox or a drop-down menu of the user interface.

15. The method of claim 9, wherein the privacy setting includes one or more options associated with a type of information to be masked.

16. A non-transitory computer-readable medium storing a set of instructions for securing structured data records provided to external parties, the set of instructions comprising:
one or more instructions that, when executed by one or more processors of a device, cause the device to:
receive, from a third-party application, at least one credential;
establish a secure connection with the third-party application based on the at least one credential;
receive, from a user device, an indication of a privacy setting associated with a set of accounts of a user,
wherein the indication of the privacy setting is associated with at least one of obscuring locations or obscuring dates;
receive, from the third-party application and using the secure connection, a request for information associated with at least one account of the set of accounts;
apply a set of masks to a set of entries in at least one structured data record that is associated with the at least one account, to generate a set of masked entries, based on:
replacing a set of location indicators, included in the set of entries, with at least one of:
a set of geographic area indicators corresponding to the set of location indicators, or
a set of geographic area indicators corresponding to the set of location indicators; and
transmit, to the third-party application, the set of masked entries.

17. The non-transitory computer-readable medium of claim 16, wherein the one or more instructions, that cause the device to apply the set of masks, cause the device to:
remove a set of transaction identifiers included in the set of entries.

18. The non-transitory computer-readable medium of claim 16, wherein the indication of the privacy setting is associated with obscuring entity names, and wherein the one or more instructions, that cause the device to apply the set of masks, cause the device to:
replace a set of entity names, included in the set of entries, with a set of categories corresponding to the set of entity names.

19. The non-transitory computer-readable medium of claim 16, wherein the indication of the privacy setting is associated with obscuring locations, and wherein the one or more instructions, that cause the device to apply the set of masks, cause the device to:
remove a set of location indicators included in the set of entries.

20. The non-transitory computer-readable medium of claim 16, wherein the privacy setting includes one or more options associated with a type of information to be masked.

* * * * *